No. 895,104.  
PATENTED AUG. 4, 1908.

A. E. NEWTON.  
GEARING.  
APPLICATION FILED JULY 18, 1903.

2 SHEETS—SHEET 1.

Witnesses:

Inventor,  
A. E. Newton  
By his Attorneys,  
Luthgate & Luthgate

UNITED STATES PATENT OFFICE.

ALBERT E. NEWTON, OF WORCESTER, MASSACHUSETTS.

GEARING.

No. 895,104.    Specification of Letters Patent.    Patented Aug. 4, 1908.

Application filed July 18, 1903. Serial No. 166,109.

*To all whom it may concern:*

Be it known that I, ALBERT E. NEWTON, a citizen of the United States, residing at Worcester, in the county of Worcester and State of Massachusetts, have invented a new and useful Gearing, of which the following is a specification.

This invention relates to a set of driving connections which has been especially designed for use on radial drills or similar machines.

The especial object of this invention is to provide a simple, direct, inexpensive and efficient change speed driving mechanism which is adapted to produce a number of speed adjustments.

Figure 1:
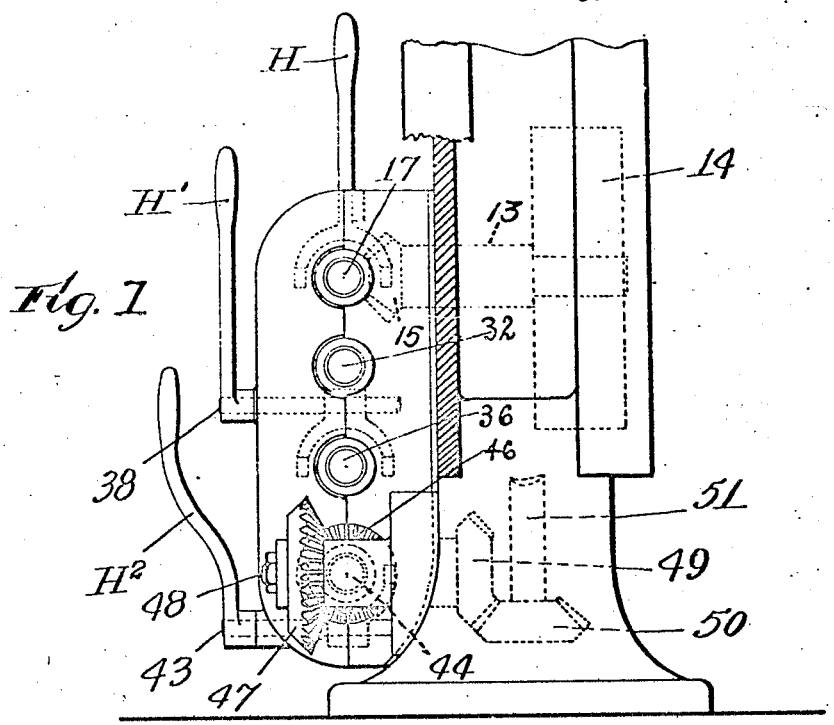
Figure 4:
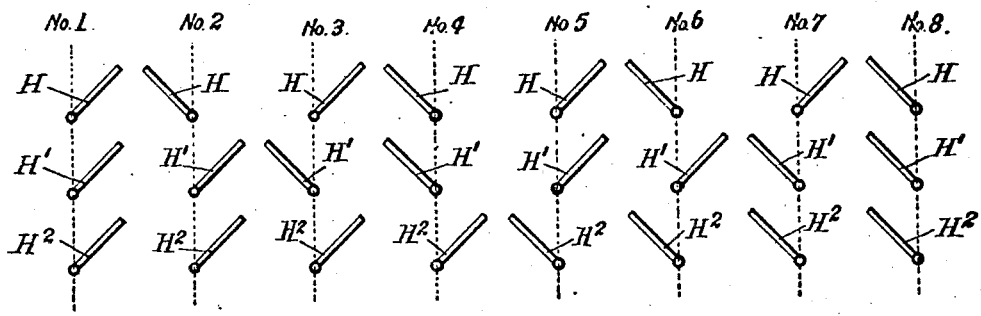
Figure 3:
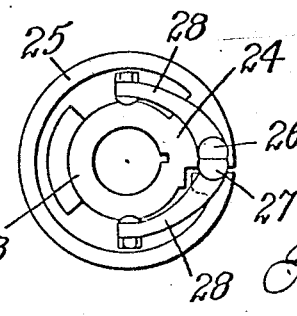
Figure 2:
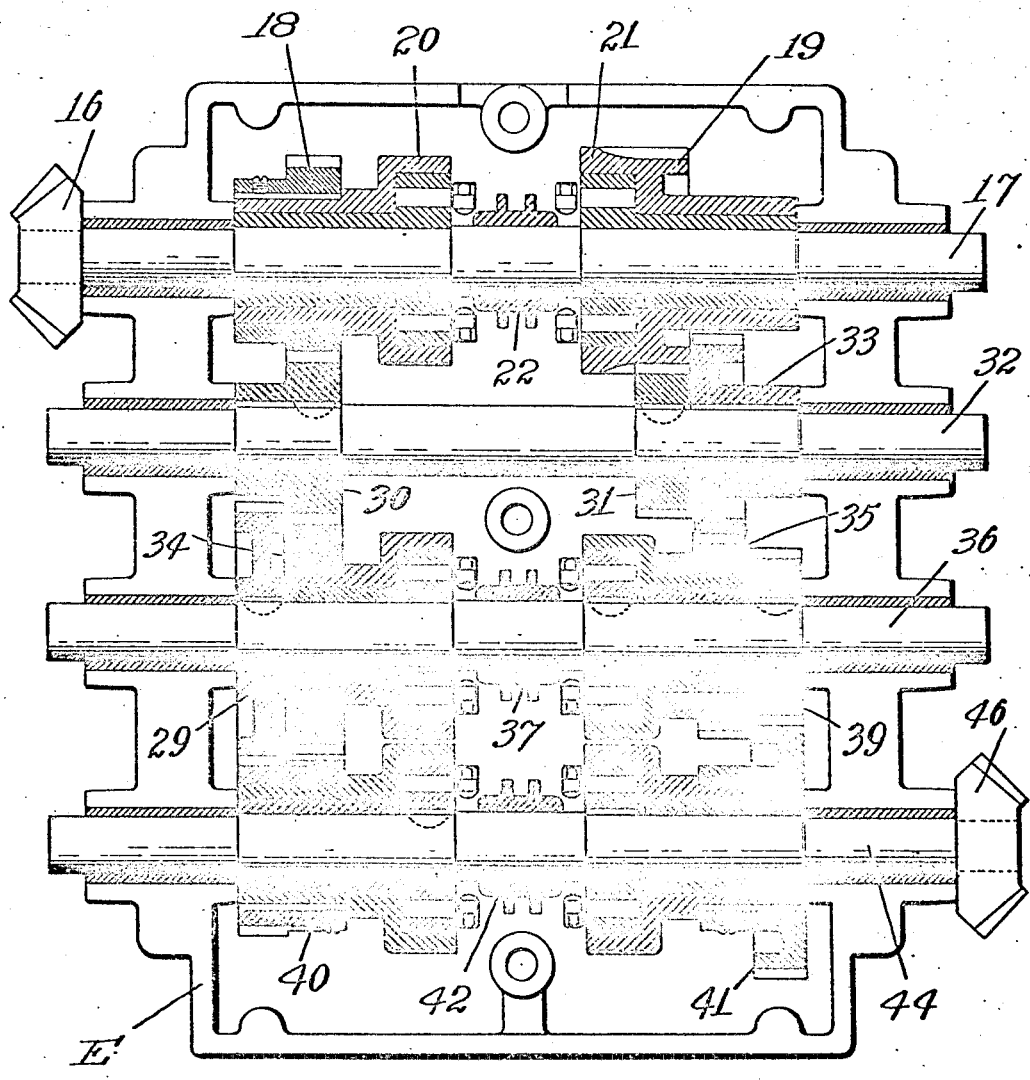

Change speed connections constructed according to this invention have been especially designed to be housed in a casing which may be mounted at the side of the frame of a radial drill in such position that all the speed changing handles will be located together in position to be conveniently reached by the operator.
To these ends, this invention consists of the parts and combinations of parts as hereinafter described and more particularly pointed out in the claims at the end of this specification.
In the accompanying three sheets of drawings, Figure 1 is an end view of parts of a radial drill with my invention applied thereto. Fig. 2 is an enlarged transverse sectional view of the train of speed changing connections mounted within the casing. Fig. 3 is a detail view of one of the friction clutches, and Fig. 4 shows a number of diagrammatic views illustrating the different positions of operating handles to produce different speed changes.

In the ordinary radial drills or similar machine tools which have heretofore been employed, a number of adjustments have been required to secure changes of the speed of the drill spindles. In most of such machines the different change speed adjustments have been provided for at a number of different points in the driving train which transmits the power to the drill spindle, and in the use of many such machines an operator is required to move from the position usually occupied by him in order to reach the parts which have to be adjusted or set when the speed of the drill spindle is to be changed.
One especial object of my present invention is to provide a form of driving mechanism for machinery of this class in which the several speed changing mechanisms are combined in a simple and direct manner so that they can be located close together occupying comparatively little room and having the adjusting handles so located that they may be controlled by the operator without change of position.

The change speed driving connections constructed according to my invention as herein illustrated, comprise a driving shaft 13 carrying the ordinary pulley 14. Fastened upon the shaft 13 is a bevel gear 15 which meshes with and drives a bevel gear 16 secured upon the driver or primary cross-shaft 17 of the change speed gearing mounted in a casing or frame E.

The interior construction of the casing E is most clearly illustrated in Fig. 2. As shown in this figure, two gears 18 and 19 are mounted loosely on the primary cross-shaft 17. The gears 18 and 19 are provided with bored out hubs 20 and 21 respectively, and fitting into the hubs 20 and 21 are the expanding members of friction clutches for connecting either the gear 18 or 19 to the shaft 17 as desired. The friction clutches for connecting either the gear 18 or 19 to the shaft 17 as desired, are controlled by an operating piece 22 which may be shifted in either direction by a yoke extending down from an operating handle H, as shown in Fig. 1.

The construction of expanding friction clutch member which I preferably employ is most clearly illustrated in Fig. 3. As shown in this figure, 23 designates a hub which is fastened to the shaft. Extending from the hub 23 is an arm 24 carrying an expanding or split ring 25. Mounted in segment shaped openings subtending an arc of more than 180 degrees in the adjacent ends of the split ring 25 are operating pins 26 and 27 having flattened or slabbed faces normally in engagement with each other. Extending from the pins 26 and 27 are the arms 28, the ends of which are engaged by the operating slide 22 when the clutch is to be set or operated.

Meshing with and driven by the gears 18 and 19 respectively are gears 30 and 31 which are secured upon a second or transmitting shaft 32. Also fastened on the transmitting shaft 32 is a gear 33. Meshing with and driven from the gears 30 and 33 respectively are gears 34 and 35 which are mounted loosely upon a third shaft 36. Fitting into the hubs of the gears 34 and 35 are expanding sections of friction clutches similar in construction to that illustrated in Fig. 3 before referred to, which friction clutches may be operated by an operating piece 37. As shown most clearly in Fig. 1, the operating piece 37 may be moved by a yoke extending down from a shaft 38, which has the upwardly extending handle H'. Fastened upon the shaft 36 are the gears 29 and 39, and meshing with and driven from the gears 29 and 39 respectively are gears 40 and 41 which are journaled loosely on the final shaft 44 of the change speed gearing. Fitting into the hubs of the gears 40 and 41 are the expanding sections of a third set of friction clutches which may be operated by an operating piece 42. As shown most clearly in Fig. 1, the operating piece 42 may be shifted by a yoke extending up from a shaft 43, which carries the third adjusting handle H². The bottom or final shaft 44 of this speed change mechanism is provided with a bevel pinion 46, which meshes with and drives a bevel gear 47 on one end of a short shaft 48. At its other end, as indicated by dotted lines in Fig. 1, the shaft 48 is provided with a bevel gear 49 which meshes with and drives a bevel gear 50 on the vertical shaft 51, which may be connected with the ordinary change gear connections for raising and lowering the base-piece or carriage.

In the use of a radial drill or other machine as thus equipped, a considerable variety of spindle speeds may be secured, and the machine may be controlled by the operator in a simple and direct manner without shifting his position from the side of the machine. That is to say, the three handles which provide for variations in spindle speeds are located directly over each other, and the different desired driving speeds may be secured by shifting these handles to different positions.

As illustrated in Fig. 4, eight changes of speed may be secured. For example, when the handles are all thrown to the left, as illustrated by the position marked No. 1, in Fig. 4, the shaft 17 will be coupled to the shaft 32 through the gears 18 and 30; the shaft 32 will be coupled to the shaft 36 through the gears 30 and 34; while the shaft 36 will be coupled to the shaft 44 through the gears 39 and 41. In each of these transmissions, power is transmitted from a smaller to a larger gear, so that when the parts are in this position, the slowest spindle speed will be secured.

When the upper handle H' is shifted to the right, for example, as indicated in the position marked No. 2 in Fig. 4, power will be transmitted from the shaft 17 to the shaft 32 through the gears 19 and 31 instead of through the gears 18 and 30, and as the driving gear 19 is larger than the gear 31 which is driven thereby, an increase of spindle speed over that secured when the parts are in the position marked No. 1 will be provided.

Further variations of spindle speed may be successively obtained by throwing the middle lever H' alone to the right, as illustrated in the position marked No. 3; by throwing both the top and middle levers to the right, as indicated in the position marked No. 4; by throwing the bottom lever alone to the right, as indicated in the position marked No. 5; by throwing the top and bottom levers to the right, as indicated in the position marked No. 6; by throwing the middle and bottom levers to the right, as indicated in the position marked No. 7; and by throwing all three levers to the right, as indicated in the position marked No. 8.

The relative diameters of the several sets of intermeshing gears of a speed changing mechanism constructed according to this invention are preferably so proportioned that the several different positions of the handles will produce variations in the spindle speeds which increase in regular sequence, although any desired speed ratio may be secured by varying the relative diameters of the intermeshing gears.

I am aware that numerous changes may be made in practicing my invention by those who are skilled in the art without departing from the scope of my invention as expressed in the claims, and while my driving connections have been especially designed to form part of radial drilling machines, it is to be understood that the same in some cases may be used to advantage on other classes of machines. I do not wish, therefore, to be limited to the construction I have herein shown and described, but What I do claim and desire to secure by Letters Patent of the United States is:—

1. In a construction of the class described, the combination of a plurality of shafts, sets of intermeshing gears, certain gears of each set being loosely mounted on said shafts, and friction clutches for making connection between said shafts through the desired sets of gears.

2. In a construction of the class described, the combination of a casing, a plurality of shafts journaled in said casing, sets of gears, each set being connected with one of said shafts friction clutches for making connection between said shafts through the desired sets of gears, and a plurality of operating handles for operating the clutches.

3. In a radial drill, the combination of the frame or upright, a vertical shaft therein, a primary power driven shaft, and speed changing connections between the power driven shaft and vertical shaft comprising a casing secured to the frame, a plurality of shafts journaled therein, sets of intermeshing gears, certain gears of each set being loosely mounted on the shafts, friction clutches for making connection between said shafts through the desired sets of gears, and handles for operating the friction clutches arranged to be controlled from the ordinary position of the operator.

4. In a construction of the class described, the combination of a casing, horizontal shafts journaled over each other in the casing, sets of intermeshing gears, certain gears of each set being loosely mounted on the shafts, and friction clutches for connecting the shafts through the desired sets of said gears.

5. In a construction of the class described, the combination of a casing, a plurality of parallel shafts journaled therein, sets of intermeshing gears, certain gears of each set being loosely journaled on said shafts, oppositely facing friction clutches for making connection between said shafts through the desired sets of gears, and an operating handle for controlling each oppositely facing set of friction clutches.

6. In a construction of the class described, the combination of a casing, a horizontal driver shaft journaled in the upper part of the casing, two gears of relatively different diameters mounted loosely on the driver shaft, oppositely facing friction clutches, and an operating handle for connecting the driver shaft to the desired one of the loose gears, an intermediate shaft gears thereon meshing with the loose gears on the driver shaft, a third or transmitting shaft, and a variable speed connection between the gears on the intermediate shaft and the said third shaft.

7. In a construction of the class described, the combination of a casing, a driver shaft journaled therein, an intermediate shaft, change speed connections between the intermediate shaft and driver shaft, a third or transmitting shaft, change speed connections between the intermediate shaft and third shaft, comprising two gears loosely mounted on the third shaft, connected with the intermediate shaft, and friction clutches for driving the third shaft from either one of the loose gears.

8. In a construction of the class described, the combination of a casing, four shafts journaled in the casing, change speed connections between the driver shaft and the second or intermediate shaft, between the intermediate shaft and the third shaft, and between the third shaft and the fourth shaft, comprising a plurality of sets of loosely mounted gears, friction clutches between the gears of each set making connection between the shaft and the gears, and a handle for shifting each set of friction clutches.

9. In a construction of the class described, the combination of a casing, four horizontal shafts journaled in the casing over each other, change speed connections between the driver shaft and the second or intermediate shaft, between the intermediate shaft and the third shaft, and between the third shaft and the fourth shaft, each of said change speed connections comprising a pair of loosely mounted gears, oppositely facing friction clutches for making connection with either one of said gears, and a handle for shifting each set of friction clutches, the three shifting handles being located close together.

10. In a radial drill, the combination of the frame or upright, the vertical shaft therein, the power driven shaft, and a change speed gearing between the power driven shaft and said vertical shaft comprising a casing adapted to be secured to the frame of the machine, four horizontal shafts journaled in the casing over each other, change speed connections between the first and second shafts, between the second and third shafts, and between the third and fourth shafts respectively, each comprising a pair of loosely mounted gears, a pair of oppositely facing friction clutches, and an operating handle for each pair of friction clutches, the three operating handles for the change speed gearing being located over each other, and in position to be controlled by an operator without change of position.

11. The combination of a frame, a shaft therein, a power-driven shaft, and a change-speed gearing between the power-driven shaft and the first named shaft, comprising a casing adapted to be secured to the frame of the machine, four parallel shafts journaled in the casing, change speed connections between the first and second shaft, between the second and third shafts, and between the third and fourth shafts respectively, each comprising a pair of loosely mounted gears, a pair of oppositely facing friction clutches, and an operating handle for each pair of friction clutches.

12. In a construction of the class described, the combination of a casing, a plurality of shafts journaled in the casing, gearing connecting said shafts, comprising three pairs of gears loosely mounted on different shafts and means for connecting either one of either pair of gears to its shaft, producing eight speed changes.

13. In a construction of the class described, the combination of the casing, a driving shaft, a second shaft, and a third shaft, two transmitting trains, each comprising gears loose upon the driving shaft and third shaft, and a gear secured on the second shaft, the gears on the driving and third shaft each having an inwardly extended hub and an expansion friction ring therein, and an operating piece located between said hubs.

14. In a construction of the class described, the combination of a casing, shafts journaled therein, comprising a driving shaft, a second shaft, a third shaft, two trains of gears for connecting said shafts, each train comprising gears loose upon the driving shaft and third shaft respectively, with an intermediate gear on the second shaft, the hubs of the gears on the driving shaft and third shaft each having friction clutch mechanism for connecting the same to the shafts, a single operating piece for both of the friction clutch mechanisms of each shaft, and an operating handle for each of the operating pieces.

15. In a construction for securing eight different speed changes, the combination of a casing, shafts journaled therein, comprising a driving, second, and third and fourth shafts, gear trains connecting said shafts and comprising two gears loosely mounted on each of the driving and third and fourth shafts and friction clutches for connecting any one of the loose gears to their shafts.

16. In a construction for securing eight changes of speed, the combination of a casing, shafts journaled therein, comprising a driving shaft, a second shaft and third and fourth shafts, trains of gearing connecting the driving second and third and fourth shafts, each gear train comprising three gears including the gears loose on the driving and third shafts and an intermediate gear on the second shaft, gears turning with the loose gears on the third shaft and meshing with gears loose on the fourth shaft, friction clutches and means for operating the same for connecting the desired ones of the loose gears to their shafts.

In testimony whereof I have hereunto set my hand, in the presence of two subscribing witnesses.

ALBERT E. NEWTON.

Witnesses:
LOUIS W. SOUTHGATE,
MARY E. REGAN.